United States Patent
Rippelmeyer et al.

(10) Patent No.: US 9,927,064 B2
(45) Date of Patent: Mar. 27, 2018

(54) FLOW-RESTRICTING PLUG AND DIFFERENTIAL DRIVE PINION HAVING THE SAME

(71) Applicant: Toyota Motor Engineering & Manufacturing North America, Inc., Erlanger, KY (US)

(72) Inventors: Luke Alan Rippelmeyer, Canton, MI (US); Brady James Gambatese, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 385 days.

(21) Appl. No.: 14/202,318

(22) Filed: Mar. 10, 2014

(65) Prior Publication Data
US 2015/0252945 A1 Sep. 10, 2015

(51) Int. Cl.
F16H 57/04 (2010.01)
F16N 27/00 (2006.01)

(52) U.S. Cl.
CPC ......... *F16N 27/005* (2013.01); *F16H 57/043* (2013.01)

(58) Field of Classification Search
CPC ........ F16H 57/043; F16N 27/005; F16N 7/36; F16C 33/723
See application file for complete search history.

(56) References Cited

U.S. PATENT DOCUMENTS

| | | |
|---|---|---|
| 1,378,658 A * | 5/1921 | Clement ............. F16C 33/6659 384/404 |
| 4,146,207 A | 3/1979 | Rofe |
| 4,313,680 A | 2/1982 | Honnen |
| 4,484,472 A | 11/1984 | Licinit et al. |
| 4,497,202 A | 2/1985 | Mermelstein |
| 5,131,498 A * | 7/1992 | Kato ..................... F16H 57/043 184/6.12 |
| 5,215,173 A * | 6/1993 | Gimmler ................. F16H 45/02 192/3.29 |
| 5,409,042 A | 4/1995 | Kirchner |
| 5,944,419 A | 8/1999 | Streiff |
| 5,967,658 A | 10/1999 | Mohajer |
| 6,615,872 B2 | 9/2003 | Goebel et al. |
| 7,051,765 B1 | 5/2006 | Kelley et al. |
| 7,370,675 B2 | 5/2008 | Cancade et al. |
| 7,621,670 B1 | 11/2009 | England et al. |
| 7,665,887 B2 | 2/2010 | Morris, Jr. et al. |
| 7,878,705 B2 | 2/2011 | Schauerte |
| 8,443,842 B2 | 5/2013 | Sonnenberg |
| 8,539,761 B2 | 9/2013 | Lebas et al. |

(Continued)

*Primary Examiner* — Robert W Hodge
*Assistant Examiner* — Ryan P Dodd
(74) *Attorney, Agent, or Firm* — Dinsmore & Shohl LLP

(57) ABSTRACT

A plug for restricting a flow of fluid within a passageway having an interior surface with a predetermined inner diameter is provided. The plug includes a plate member having an outer edge and a rim bounding the outer edge of the plate member. The rim extends generally normal from the plate member. The rim has a contact portion and an indented portion. The contact portion contacts the interior surface of the passageway to retain the position of the plug within the passageway. The indented portion is spaced apart from the interior surface on the passageway to allow fluid to bypass the plug when the plug is located within the passageway.

18 Claims, 6 Drawing Sheets

(56) References Cited

U.S. PATENT DOCUMENTS

2003/0070877 A1* 4/2003 Min .................... F16H 57/043
 184/6.12
2013/0316866 A1 11/2013 Kawamura et al.

* cited by examiner

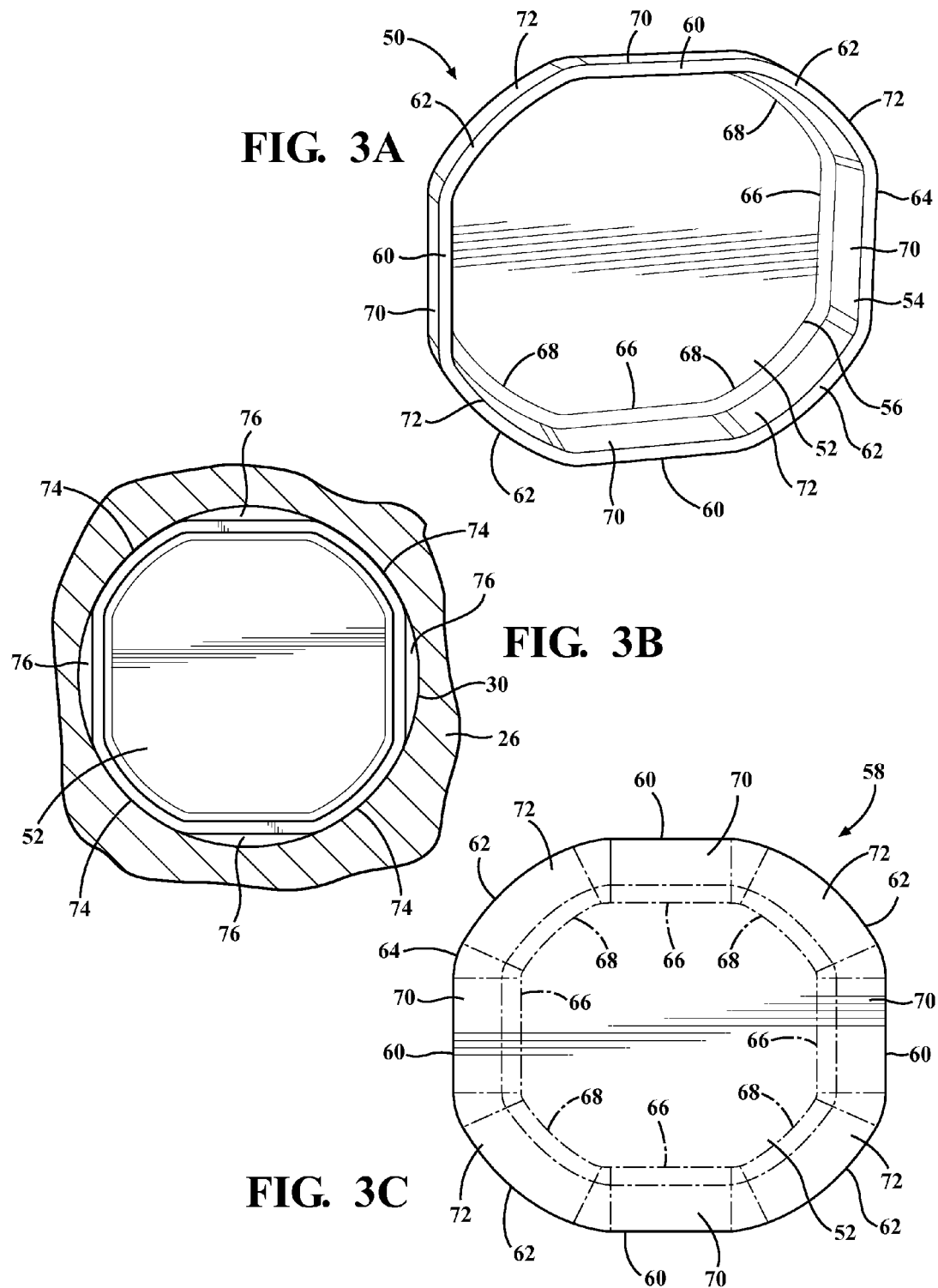

FLOW-RESTRICTING PLUG AND DIFFERENTIAL DRIVE PINION HAVING THE SAME

FIELD OF THE INVENTION

The present invention relates to differential drive pinions. More particularly, a plug for restricting the flow of a fluid through interior passage of the differential drive pinion.

BACKGROUND OF THE INVENTION

Modern day automotive vehicles typically include a drive power source, such as an internal combustion engine or an electric motor, connected to a transmission. The transmission carries the torque output from the drive power source and applies it to the driving wheel through a differential unit. A differential drive pinion is positioned between an output shaft of the transmission and an input shaft of the differential unit so as to output the inputted power.

The differential drive pinions are rotatively supported by bearings which must be lubricated to ensure proper power transmission. In order to restrain the flow of a lubricating fluid flowing through the hollow interior of the differential drive pinion, a plug is inserted therein. However, the previously known plugs require multiple manufacturing steps which increases the overall costs associated with the vehicle. Moreover, the overall price of the plugs is increased due to the increase in the required maintenance of the tool and die used in the production of the plugs.

With references to FIG. 6A through 6C a previously known plug A is provided with a plate section B and a rim section C. The plug A is press fit within the passes of the differential drive pinion and is retained by the engagement between the exterior of the rim B and the interior surface of the differential drive pinion, as seen in FIG. 6B. A plurality of aperture D are formed in the plate section B of the plug A so as to allow lubricating fluid to flow through the plug A.

As seen in FIG. 6B, the previously known plug A is formed by stamping a blank E, as seen in FIG. 6C, from a sheet of metallic material (not shown). Next, the blank E is required to undergo a drilling operation in which the plurality of apertures 16 that are formed in the blank E. Then, an edge of the blank E is bent to form the rim C that surrounds the plate section B. Accordingly, the previously known plugs A require three separate operations which increases the overall cost of the plug and the vehicle.

Due to the required shape of the blank E, the tool and die required for the manufacturing thereof is required to undergo significantly increased maintenance in order to provide the required precision. However, the increase in the required maintenance of the tool and die increases the overall manufacturing time and as such, the overall cost of the part and the automotive vehicle.

A further disadvantage of the previously known plugs A is the amount of material required for formation of the blank E compared to the overall diameter of the finalized plug 10. As the rim C extends the entire perimeter of the plate B the diameter of the blank E is larger than the diameter of the plate B by the length of the rim C. Accordingly, the overall cost of the previously known plugs is increased due to the large size of the blank E. Specifically, due to the specific circular shape of the blanks E, the number of blanks E that can be formed from a sheet is reduced.

Further still, as the shape of the plug A is formed by drawing the blank E so as to form the rim C, the plurality of apertures D are required to be provided within the interior of the plate B. As such, during periods of non-rotation of the differential drive pinion a portion of the lubricating fluid flowing through the passageway is blocked by the plate B due to the positioning of the apertures being spaced from the interior surface of the passage. Even during conditions of rotation of the differential drive pinion, a portion of the lubricating fluid is blocked from flowing to the bearings due to the positioning of the aperture D spaced apart from the interior surface of the passageway, as clearly seen in FIG. 6B.

Thus, there exists a need in the art to provide a plug for restricting the flow of a fluid within a passageway of a differential drive pinion that reduces costs, and weight by decreasing the required daily maintenance and the overall size of the blank used to form the plug, and which prevents the blockage of a portion of the lubricating fluid flow from flowing to the bearings due to the positioning of the apertures that are spaced apart from the interior surface of the passageway of the differential drive pinion.

SUMMARY OF THE INVENTION

The present invention provides a plug for restricting the flow of fluid and a differential drive pinion having the same which overcomes the above-mentioned disadvantages of increased cost and manufacturing steps of the previously known lock pins, thereby, providing a reduction in the cost and weight of the plug. The plug further reduces the amount of the lubricating oil that is retained within the passageway.

In brief, a plug for restricting a flow of fluid within a passageway having an interior surface with a predetermined inner diameter is provided. The plug includes a plate member having an outer edge and a rim bounding the outer edge of the plate member. The rim extends generally normal from the plate member. The rim has a contact portion and an indented portion. The contact portion contacts the interior surface of the passageway to retain the position of the plug within the passageway. The indented portion is spaced apart from the interior surface on the passageway to allow fluid to bypass the plug when the plug is located within the passageway.

BRIEF DESCRIPTION OF THE DRAWINGS

A better understanding of the present invention will be had upon reference to the following detailed description when read in conjunction with the accompanying drawings wherein like referenced characters refer to the like parts throughout the several views and in which:

FIG. 3A is a perspective view of the inventive plug;

FIG. 3B is a cross-sectional view taken along line BB of FIG. 2;

FIG. 3C is a plan view of a blank used to form the inventive plug;

DETAILED DESCRIPTION OF THE INVENTION

The present invention has utility as a plug for restricting the flow of a fluid within a differential drive pinion. By providing the plug with an indented portion of a rim that extends from the outer edge of a plate, the overall weight, cost, and manufacturing steps required for manufacturing the plug can be reduced. In addition, by providing the indented portion such that the rim is spaced apart from a portion of the interior surface of the passageway of the differential drive pinion, the plug eliminates the retention of the lubricating oil flow at the circumferential edge of the plug.

Figure 1:
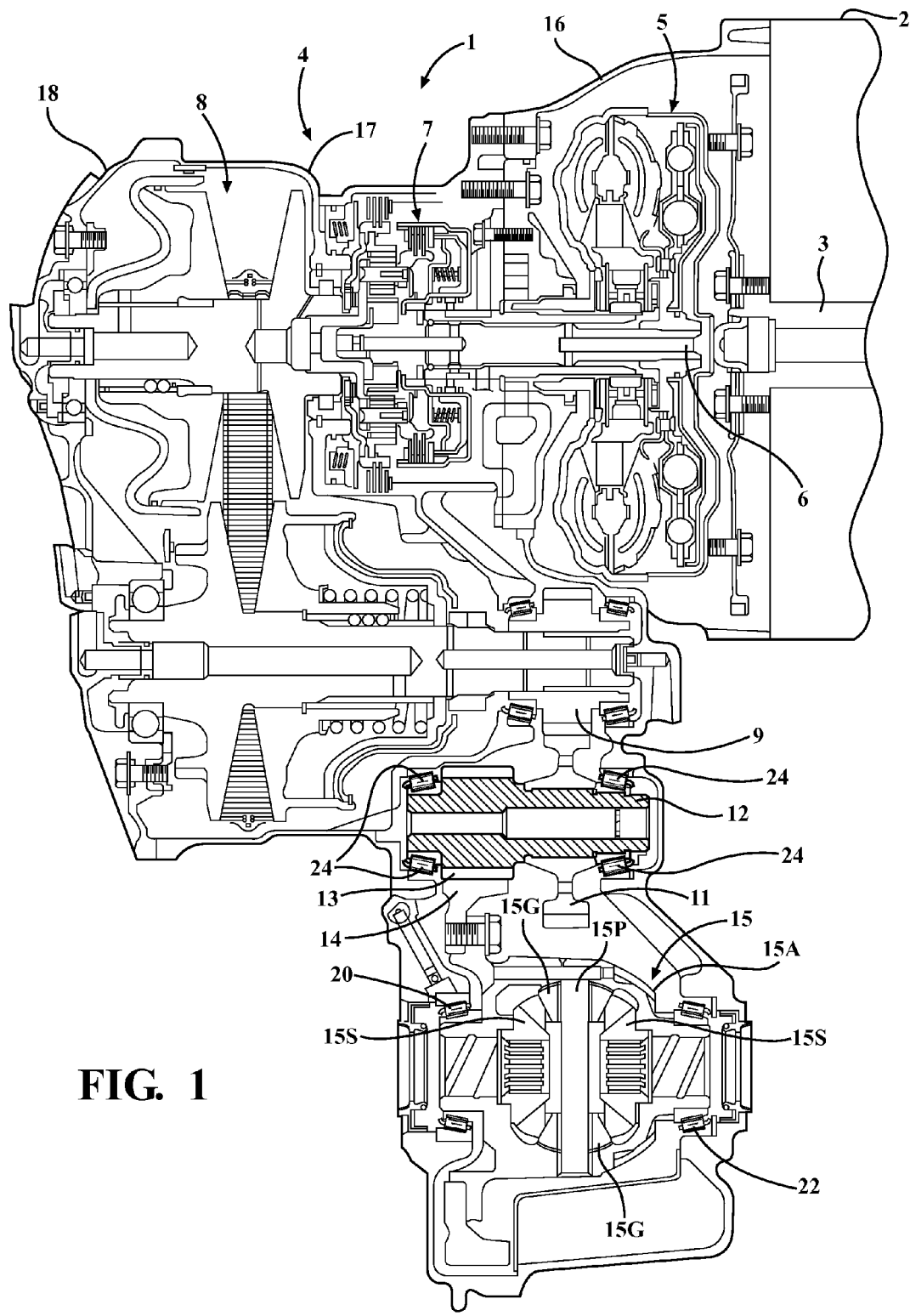
FIG. 1 is a cross-sectional view of a power distribution path of an automotive vehicle.

With reference to FIG. 1, an automotive vehicle is generally illustrated at 1. The automotive vehicle in the illustrated embodiment is a front-wheel drive vehicle that includes a traverse mounted engine 2. The engine 2 is operable using gasoline as a liquid fuel; however, the engine 2 is not limited to such a configuration and optionally includes an electric motor. The vehicle 1 is provided with a transaxle 4 that is arranged to one side of the engine 2. The transaxle 4 is connected to a crankshaft 3 of the engine 2.

The transaxle 4 includes a torque converter 5 connected to the crankshaft 3, a forward/reverse switching apparatus 7 connected to the torque converter 5 via an input shaft 6, a belt-type continuously variable transmission (CVT) 8 that is connected to the forward/reverse switching apparatus 7, a counter-drive gear 9 that is connected to the belt-type CVT 8, a differential drive pinion 12 that supports a counter-driven gear 11, and a final drive gear 13, a ring gear 14 that is engaged with the final drive gear 13, a differential unit 15 connected to the ring gear 14, a transaxle housing 16 that houses the various elements of the transaxle 4, a transaxle case 17 and a transaxle cover 18.

The differential unit 15 includes a hollow differential case 15A that is rotatively supported by a bearing 20 provided on the transaxle case 17 and a bearing 22 provided on the transaxle housing 16. The ring gear 14 is fixed to the outer peripheral portion of the hollow differential case 15A and engages with the final drive gear 13 of the differential drive pinion 12.

A pinion shaft 15P is supported by the hollow differential case 15A and a pair of pinion gears 15G are rotatively supported by the pinion shaft 15P. The pair of pinion gears 15G are enmeshed with a pair of side gears 15S, a left front drive shaft (not shown) is connected to one of the side gears 15S and a right front drive shaft (not shown) is attached to the other side gear 15S. The left front drive shaft and the right front drive shaft are connected to a left front wheel and a right front wheel, respectively, (not shown).

During operation of the engine 2 the crankshaft 3 is rotated and the CVT 8 is used to alter the torque output from the crankshaft 3 of the engine 2. The output rotation of the CVT 8 is transferred by the counter-drive gear 9 and inputted into the counter-driven gear 11 of the differential drive pinion 12. The rotation of the differential drive pinion 12, due to the engagement of the counter-driven gear 11 with the rotating counter-drive gear 9, drives the final drive gear 13 which rotates the ring gear 14. The rotation of the ring gear 14 rotates the pinion shaft 15P which drives the pair of pinion gears 15G to rotate the pair of side gears 15S. The rotation of the pair of side gears 15S drives the left front drive wheel and the right front drive wheel.

Due to the engagement of the pinion gears 15G with the side gears 15S, differential speeds of the left front drive wheel and the right front drive wheel are accommodated by allowing the left front drive wheel and the right front drive wheel to rotate at different speeds.

Figure 2:
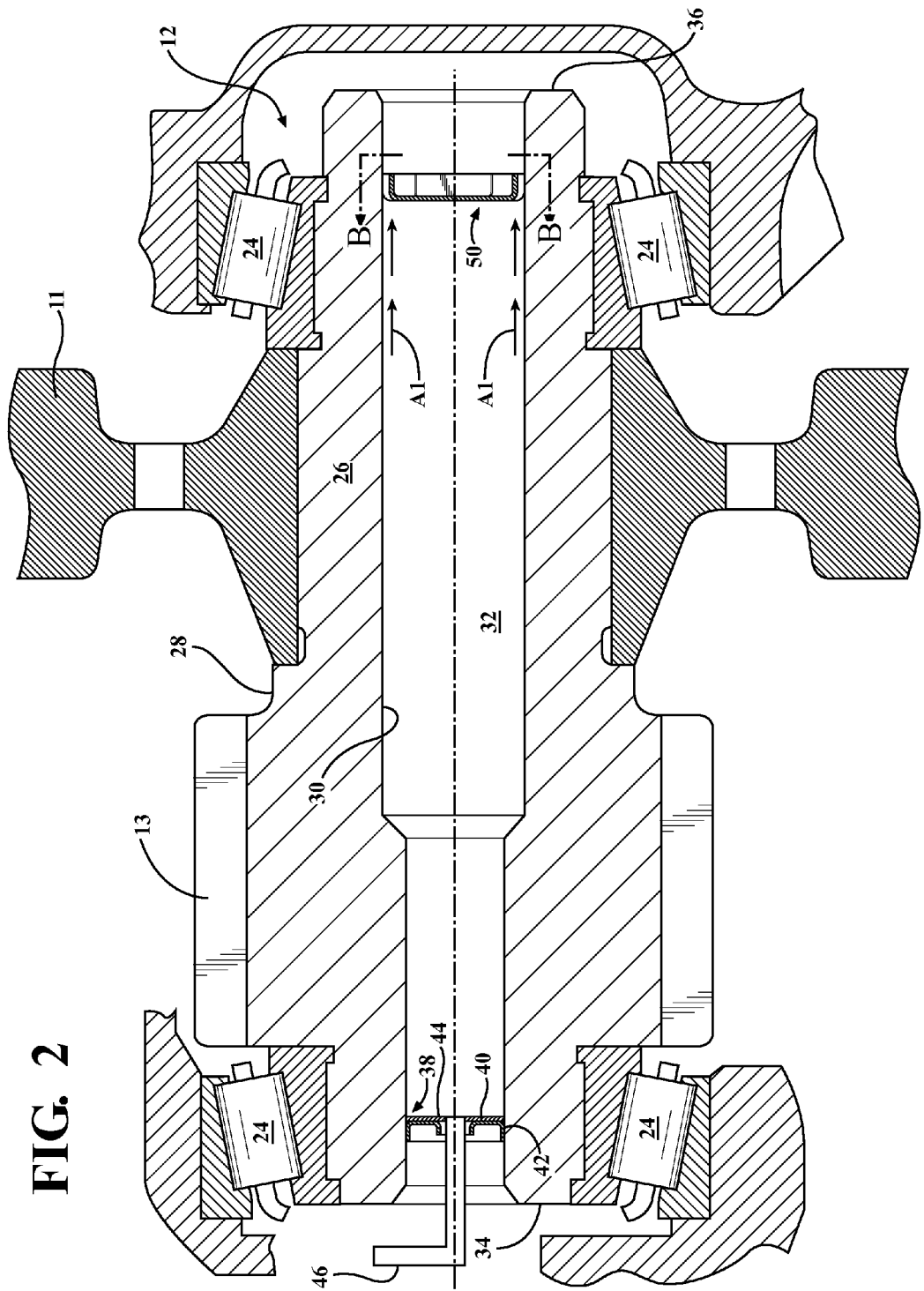
FIG. 2 is a partial cross-sectional view illustrating the differential drive pinion and plug.

With reference to FIG. 2, the differential drive pinion 12 is rotatively supported by bearings 24 at either end of the differential drive pinion 12. The differential drive pinion 12 is formed as a hollow shaft 26 having an exterior surface 28 and an interior surface 30 defining an interior passage way 32. The differential drive pinion 12 rotates about a center axis O of the interior passageway 32. As discussed in greater detail below, the interior passageway 32 has a generally circular cross-sectional shape and extends from a first end 34 to a second end 36 of the differential drive pinion 12. Due to the rotation of the differential drive pinion 12, the bearings 24 require lubrication by oil or other such lubricating fluid to provide smooth rotation of the differential drive pinion 12 and to remove heat generated by the rotation of the differential drive pinion 12.

In order to provide lubrication to the bearings 24 adjacent the second end 36, insert 38 is positioned within the interior passageway 32 adjacent the first end 34. The insert 38 includes a plate structure 40 having a rim 42 extending outwardly from the plate structure 40. A central aperture 44 is provided in the plate structure 40 to allow a fluid inlet 46 which transfers fluid, such as a lubricating oil, from a reservoir (not shown) via a pump (not shown).

In order to properly lubricate the bearings 24 adjacent the second end 36, the lubricating oil is partially restricted to aid in the distribution of the lubricating oil around the circumference of the second end 36 of the differential drive pinion 12. As such, a plug 50 is inserted into the interior passageway 32 adjacent the second end 36.

With reference to FIGS. 3A through 3C, the structure of the inventive plug 50 will now be described. The plug 50 is formed of a generally planar plate member 52 and a rim 54 extending outwardly from an outer peripheral edge (referred to hereinafter as 'outer edge') 56 of the plate member 52.

As seen in FIG. 3C, a blank 58 from which the plug 50 is formed is a generally flat member having two pair of parallel lines 60 disposed symmetrically around the perimeter of the blank 58. Each of the pair of parallel lines 60 are provided on opposite sides of the blank 58. Interspersed between the two pair of parallel lines 60 are two pair of curved lines 62. Each of the pair of curved lines 62 are disposed on opposite sides of the blank 58. The two pair of parallel lines 60 and the two pair of curved lines 62 provide the blank with a segmented circular shape, as seen in FIG. 3C. The parallel lines 60 and the curved lines 62 form a distal edge 64 of the rim 54.

As seen in FIG. 3A, disposed interior of the distal edge 64 of the rim 54 is the outer edge 56 of the plate member 52. The outer edge 56 corresponds in shape to the distal edge 64 of the rim 54. Specifically the outer edge 56 of the plate member 52 includes two pair of opposing parallel edges 66 and two pair of opposing curved edges 68.

During formation of the plug 50, the blank 58 is drawn or stamped such that the rim 54 is bent so as to extend generally normal from the plate member 52. The term generally normal is defined as 90°±10°. The rim 54 is formed at the junction of the outer edge 56 of the plate member 52. As such, the rim 54 is provided as a continuous wall that bounds the outer edge 56 of the plate member 52 as shown in FIG. 3A.

The rim 54 is provided with two pair of linear walls 70 and two pair of curved walls 72. The linear walls 70 correspond to the parallel lines 60 at the distal edge 64 of the rim 54, and the curved walls 72 correspond to the curved lines 62 at the distal edge 64 of the rim 54. Each of the linear walls 70 extends parallel with an opposing linear wall 70 disposed on an opposite side of the plug 50. The curved edges 68 of the outer edge 56 of the plate member 52 and the curved walls 72 of the rim 54 correspond in curvature to the inner diameter of the interior passageway 32 of the differential drive pinion 12, as seen in FIG. 3B. Specifically it is the frictional engagement due to a press fitting between the exterior of the curved walls 72 and the interior surface 30 of the hollow shaft 26 that secures the plug 50 within the interior passageway 32.

With reference to FIG. 3B, a cross-sectional view taken along the line BB of FIG. 2 illustrates the plug 50 upon insertion into the interior passageway 32. Specifically, exterior surfaces of the curved walls 72 of the rim 54 are provided in an abutting engagement with the interior surface 30 of the interior passageway 32 formed in the hollow shaft 26. The plug 50 is inserted within the interior passageway 32 by press fitting the plug 50 such that the frictional engagement of the curved wall 72 against the interior surface 30 is capable of maintaining the plug 50 within the interior passageway 32 against the force of the lubricating fluid acting on the plate member 52 and the centrifugal forces due to the rotation of the differential drive pinion 12 about rotation axis C, as seen in FIG. 2.

The formation of the parallel lines 60 in the outer edge 56 of the plate member 52, which correspond to the parallel lines 60 formed in the distal edge 64 of the rim 54 creates indented passages 76 at the linear walls 70 of the rim 54. Specifically, due to the segmentation of the overall circular shape of the blank 58 by the parallel lines 60 of the distal edge 64 of the rim 54 and the corresponding parallel lines 60 formed in the outer edge 56 of the plate member 52, the shape of the rim 54 and the outer edge 56 of the plate member 52 is less than the total circular cross-section of the interior passageway 32 of the hollow shaft 26.

As such, the indented passages 76 are created by the exterior surface 28 of the linear walls 70 being spaced apart from the interior surface 30 of the interior passageway 32 of the hollow shaft 26. Upon insertion of the plug 50 within the interior passageway 32, the curved walls 72 provide contact portions 74 which maintain the plug 50 within the interior passageway 32 and the indented passages 76 allow fluid flowing in the direction of arrow A1, as seen in FIG. 2, to bypass the plug 50 during the lubrication fluid flow such that the lubricating fluid reaches the bearings 24 at the second end 36 of the hollow shaft 26. The indented passages 76 and the contact portions 74 are shown in FIG. 3B.

A particular advantage of the plug 50 is that the positioning of the indented passages 76 allows the lubricating oil to bypass the plug 50 rather than merely flowing through apertures such as those in prior art plugs. Specifically, the lubricating oil adhering to the interior surface 30 of the interior passageway 32 is capable of flowing through the indented passages 76 to allow for complete draining of the fluid within the differential drive pinion 12. As such, even during periods of non-rotation of the differential drive pinion 12, fluid adhering to the interior surface 30 of the interior passageway 32 can drain to the bearings 24 by bypassing the plug 50 through the indented passages 76.

Figure 6A:
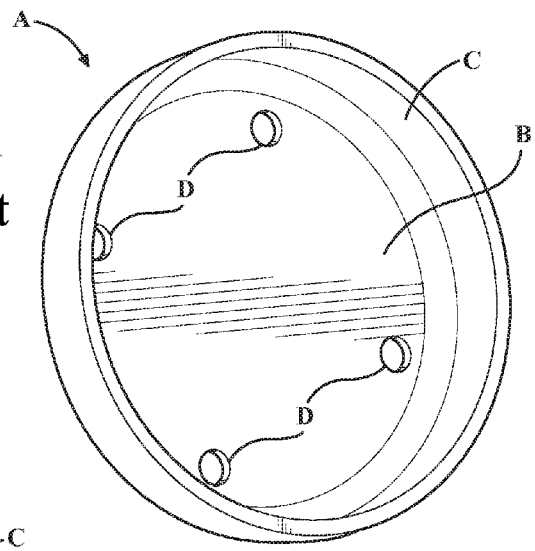
FIG. 6A is a perspective view of a previously known plug.
Figure 6B:
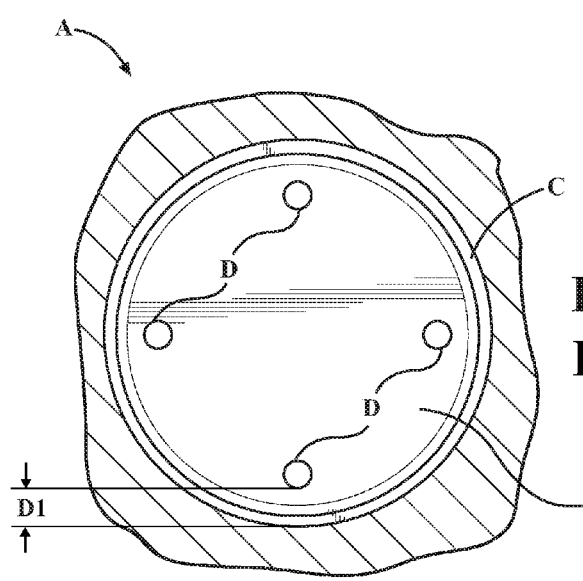
FIG. 6B is a modified cross-sectional view taken along the line BB of FIG. 2 illustrating the previously known plug.

In sharp contrast the previously known plug, as seen in FIG. 6B will prevent the complete draining of the lubricating fluid within the differential drive pinion as the apertures D are positioned to be spaced apart by a distance D1 from the interior surface 30 of the passage. Therefore, the lubricating oil must first reach a height of D1 or greater to exit the differential drive pinion 12.

Figure 6C:
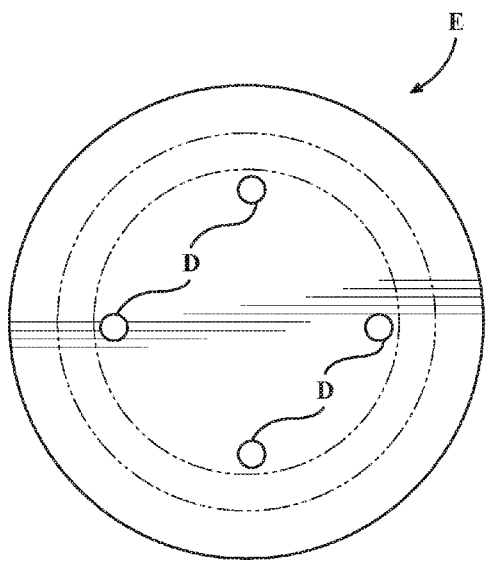
FIG. 6C is a plan view of the blank used to form the previously known plug.

As the inventive plug 50 differs from the previous plug A designs as seen in FIG. 6A through 6C, in that the amount of contact area between the exterior surface 28 of the rim 54 and the interior surface 30 of the interior passageway 32 is reduced, the lengths of the curved walls 72, which form the contact portions 74, are specifically dimensioned to provide sufficient frictional engagement within the interior surface 30 of the interior passageway 32 so as to prevent the plug 50 from being disengaged due to the centrifugal force of the rotation of the differential drive pinion 12 and the force of the lubricating fluid on the plate member 12.

In addition, the size of the indented passages 76 is dimensioned so as to allow sufficient flow of the lubricating oil to the bearings 24. The size of the indented passages 76 are determined by varying the length of the parallel lines 60 that bisecting the overall circular shape of the blank 58. Specifically, the longer the parallel lines 60, the larger the indented passages 76 and the shorter the parallel lines 60, the smaller the indented passages 76. As seen in the figures, the indented passages 76 are provided symmetrically around on the plug 50 in an interspersed relationship with the curved walls 72. The placement of four indented passages 76 allows the interior passageway 32 to drain the lubricating oil therefrom regardless of the position of the plug 50 upon stoppage of rotation of the differential drive pinion 12.

Figure 4A:
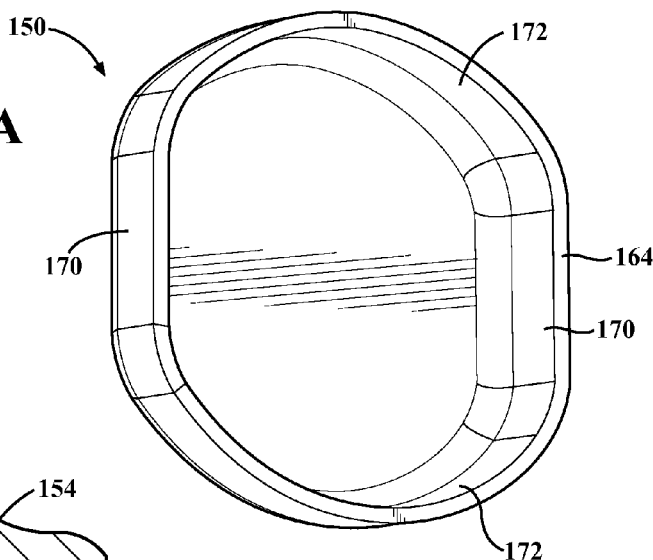
FIG. 4A is a perspective view of a modified inventive plug.
Figure 4B:
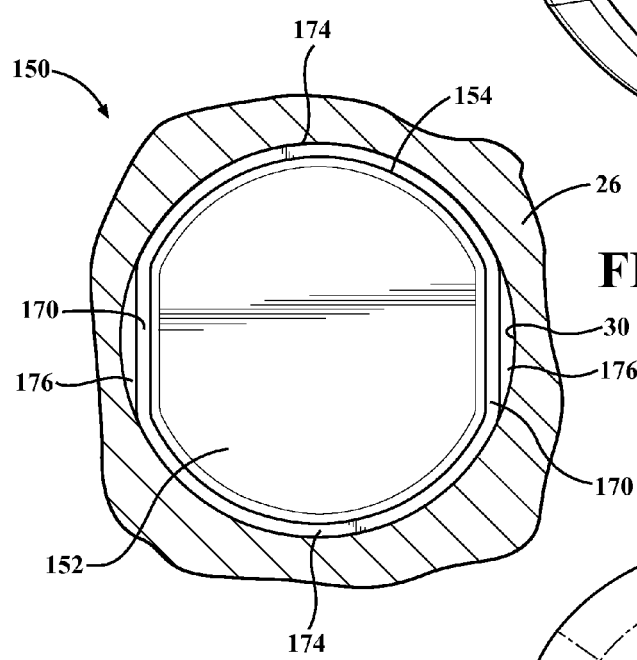
FIG. 4B is a modified cross-sectional view taken along line BB illustrating the first modified inventive plug.
Figure 4C:
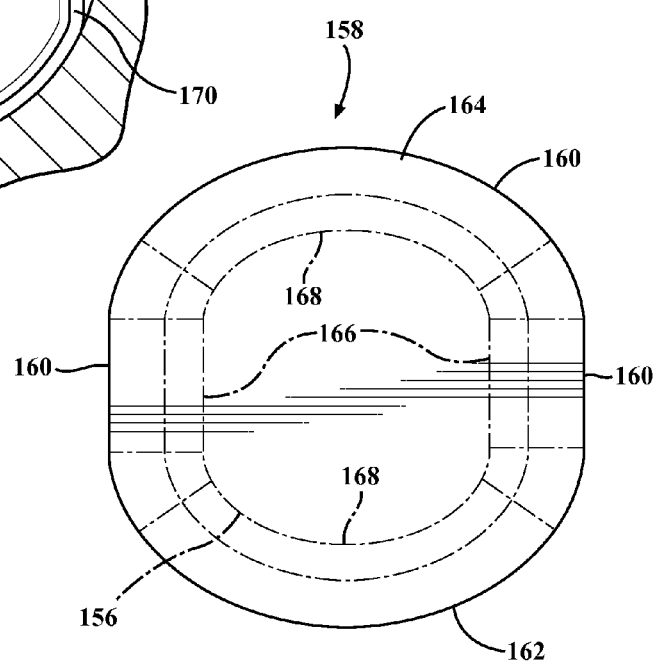
FIG. 4C is a plan view of the blank used to form the first modified inventive plug.

With reference to FIGS. 4A through 4C a modified inventive plug is generally illustrated at 150. The modified inventive plug 150 differs from the plug 50 in that the modified plug 150 is formed only with two indented passages 176 and two contact portions 174 as curved walls 172.

Figure 5A:
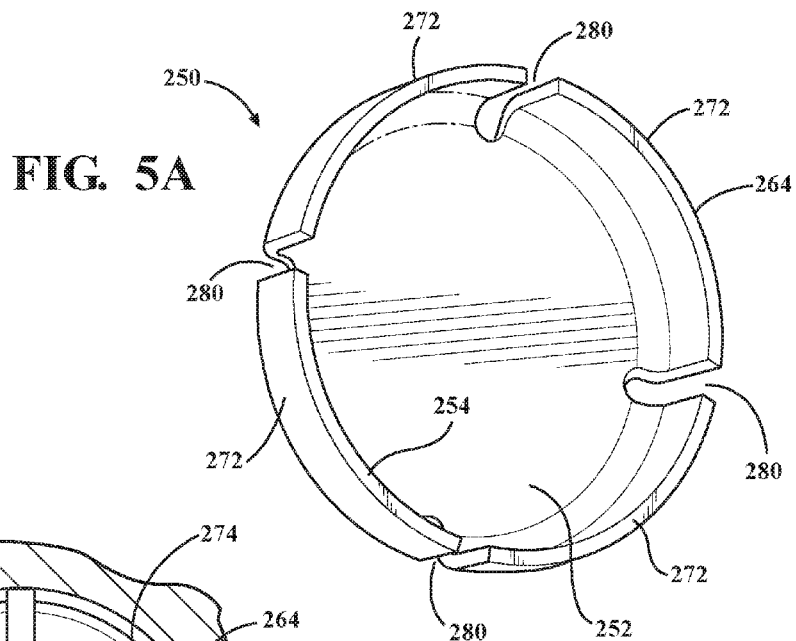
FIG. 5A is a perspective view of a second inventive modified plug.
Figure 5B:
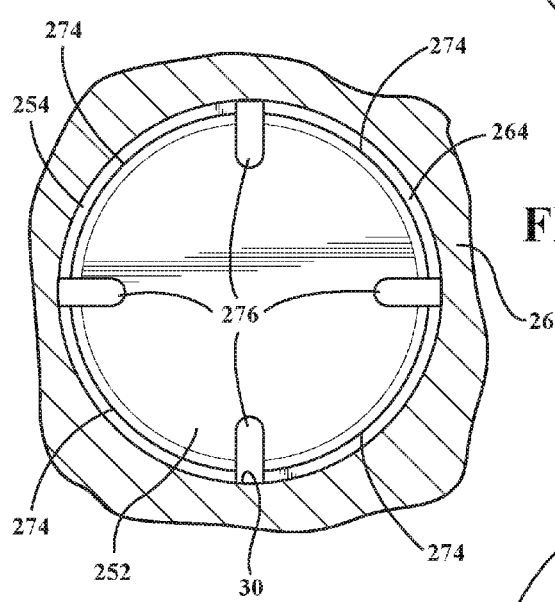
FIG. 5B is a modified cross-sectional view taken along the line BB of FIG. 2 illustrating the second modified inventive plug.
Figure 5C:
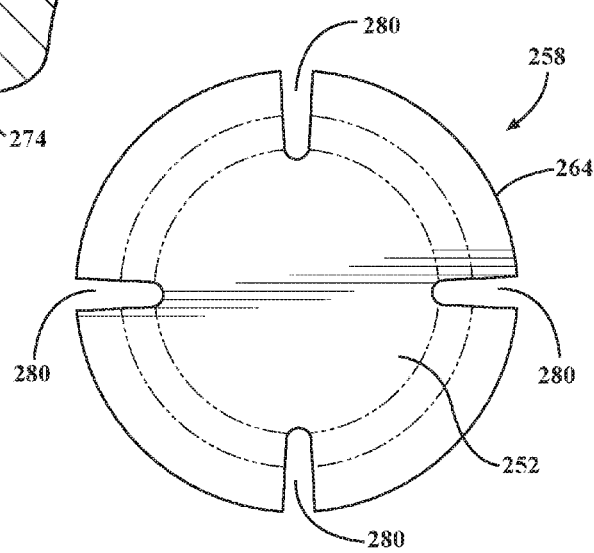
FIG. 5C is a plan view of the blank used to form the second modified inventive plug.

An alternative modified embodiment is shown in FIGS. 5A through 5C. As shown with reference to FIG. 5, modified plug 250 is formed by a generally circular blank 258 in which cutouts or notches 280 are formed at the distal edge 264 of the rim 254 and extend inwardly beyond the outer peripheral edge 256 and into a portion of plate member 252. The cutouts 280 are formed in the blank 258 and arranged in a symmetrical fashion such that the two pair of cutouts 280 are formed in opposing relationship thereto. As seen in FIG. 5A, the cutouts 280 extend from the distal edge 264 of the curved walls 272 to the plate member 252 to form the indented passages 276 that allow fluid adhering to the interior surface 30 of the interior passageway 32 to drain. The remaining portions of the rim 254, between the cutouts 280, form the contact portions 274 that retain the plug 250 within the interior passageway 32.

From the foregoing, it can be seen that the present invention provides a plug for restricting the flow of fluid which reduces manufacturing costs by reducing the required steps to form the plug and reduces the overall weight of the plug. Having described the invention; however, many modifications thereto will become apparent to those skilled in the art to which it pertains without deviation from the spirit of the invention as defined by the scope of the appended claims.

The invention claimed is:

1. A plug for restricting a flow of a fluid within a passageway having an interior surface with a predetermined inner diameter, said plug comprising:
   a planar plate member having an outer peripheral edge; and
   a rim bounding the outer peripheral edge of the plate member, the rim extending generally normal from the outer peripheral edge of the plate member, the rim having a contact portion and an indented portion, the contact portion contacting the interior surface of the passageway to retain the position of the plug within the passageway, and the indented portion spaced apart from the interior surface of the passageway to allow fluid to bypass the plug when the plug is located within the passageway,
   wherein the plate member and the rim are formed by bending a blank at a position interior of an outer edge to form the rim having the contact portion and the indented portion.

2. The plug of claim 1, wherein the rim includes an outer surface, the outer surface of the rim corresponding to the contact portion contacts the interior surface of the passageway, and the outer surface of the rim corresponding to the indented portion is spaced apart from the interior surface of the passageway.

3. The plug of claim 2, wherein the outer peripheral edge of the plate member includes a curved edge that corresponds to the contact portion of the rim, and wherein the curved edge has a curvature corresponding to the inner diameter of the interior surface of the passageway.

4. The plug of claim 3, wherein the contact portion of the rim corresponds to the curved edge of the outer peripheral edge of the plate member.

5. The plug of claim 4, wherein the outer peripheral edge of the plate member includes an indented edge spaced apart from the interior surface of the passageway, and wherein the indented portion of the rim is formed at the indented edge of the outer peripheral edge of the plate member.

6. The plug of claim 5, wherein the indented edge is a linear edge, and wherein the indented portion extends parallel with the indented edge.

7. The plug of claim 6, wherein the plug incudes a pair of contact portions and a pair of indented portions, each of the indented portions is positioned between the pair of contact portions.

8. The plug of claim 7, wherein the pair of contact portions and the pair of indented portions are arranged symmetrically along the outer peripheral edge of the plate member.

9. The plug of claim 8, wherein the plug includes two pair of opposing contact portions and two pair of opposing indented portions, the contact portions and the indented portions arranged symmetrically along the outer peripheral edge of the plate member.

10. A differential drive pinion gear for a transmission of a motor vehicle, the differential drive pinion gear rotatably supported on bearings lubricated by a lubricating fluid, the differential drive pinion gear comprising:
   a hollow shaft having a passageway with an interior surface having a predetermined diameter, the hollow shaft rotating along a central axis of the passageway;
   at least one gear provided on the exterior of the hollow shaft; and
   a plug fixedly secured within the passageway, the plug restricts the flow of lubricating fluid through the hollow shaft, the plug having a planar plate member and a rim; the plate member having an outer peripheral edge, the rim bounding the outer peripheral edge of the plate member, the rim extending generally normal from the outer peripheral edge of the plate member, the rim having a contact portion and an indented portion, the contact portion contacting the interior surface of the passageway to retain the position of the plug within the passageway, and the indented portion spaced apart from the interior surface of the passageway to allow fluid to bypass the plug,
   wherein the plate member and the rim are formed by bending a blank at a position interior of an outer edge to form the rim having the contact portion and the indented portion.

11. The differential drive pinion gear of claim 10, wherein the rim includes an outer surface, the outer surface of the rim corresponding to the contact portion contacts the interior surface of the passageway, and the outer surface of the rim corresponding to the indented portion is spaced apart from the interior surface of the passageway.

12. The differential drive pinion gear of claim 11, wherein the outer peripheral edge of the plate member includes a curved edge that corresponds to the contact portion of the rim, and wherein the curved edge has a curvature corresponding to the inner diameter of the interior surface of the passageway.

13. The differential drive pinion gear of claim 12, wherein the contact portion of the rim corresponds to the curved edge of the outer peripheral edge of the plate member.

14. The differential drive pinion gear of claim 13, wherein the outer peripheral edge of the plate member includes an indented edge spaced apart from the interior surface of the passageway, and wherein the indented portion of the rim is the indented edge of the outer peripheral edge of the plate member.

15. The differential drive pinion gear of claim 14, wherein the indented edge is a linear edge, and wherein the indented portion extends parallel with the indented edge.

16. The differential drive pinion gear of claim 15, wherein the plug incudes a pair of contact portions and a pair of indented portions, each of the indented portions are positioned between the pair of contact portions.

17. The differential drive pinion gear of claim 16, wherein the pair of contact portions and the pair of indented portions are arranged symmetrically along the outer peripheral edge of the plate member.

18. The differential drive pinion gear of claim 17, wherein the plug includes two pair of opposing contact portions and two pair of opposing indented portions, the contact portions and the indented portions arranged symmetrically along the outer peripheral edge of the plate member.

* * * * *